United States Patent [19]

Normann

[11] 4,402,471
[45] Sep. 6, 1983

[54] FLY-FISHING ARBOR

[76] Inventor: Carl N. Normann, 1503 Fulton Ave., Apartment 91, Sacramento, Calif. 95825

[21] Appl. No.: 290,156

[22] Filed: Aug. 5, 1981

[51] Int. Cl.$^3$ .................. B65H 75/40; A01K 91/00
[52] U.S. Cl. .......................................... 242/96; 43/4; 43/27.4; 242/84.2 J; 242/85.1
[58] Field of Search ................ 43/4, 4.5, 21.2, 25, 43/25.2, 27.4; 224/913, 149; 242/84.2, 85.1, 96

[56] References Cited
U.S. PATENT DOCUMENTS
4,297,802  11/1981  Normann .................. 43/4

Primary Examiner—Nicholas P. Godici
Assistant Examiner—Peter B. Martine

[57] ABSTRACT

A non-rotatable arbor, fastened by belt to waist-line of fisherman and used in combination with conventional fly-reel, onto which shooting-monofilament is wound by hand for axial departure on subsequent forward cast, thus enabling much longer casts by eliminating need for shooting-head during forward trajectory to pull coils of said monofilament, conventionally suspended from mouth or left-hand of wading fisherman, from water having appreciable viscosity and surface-tension.

1 Claim, 1 Drawing Figure

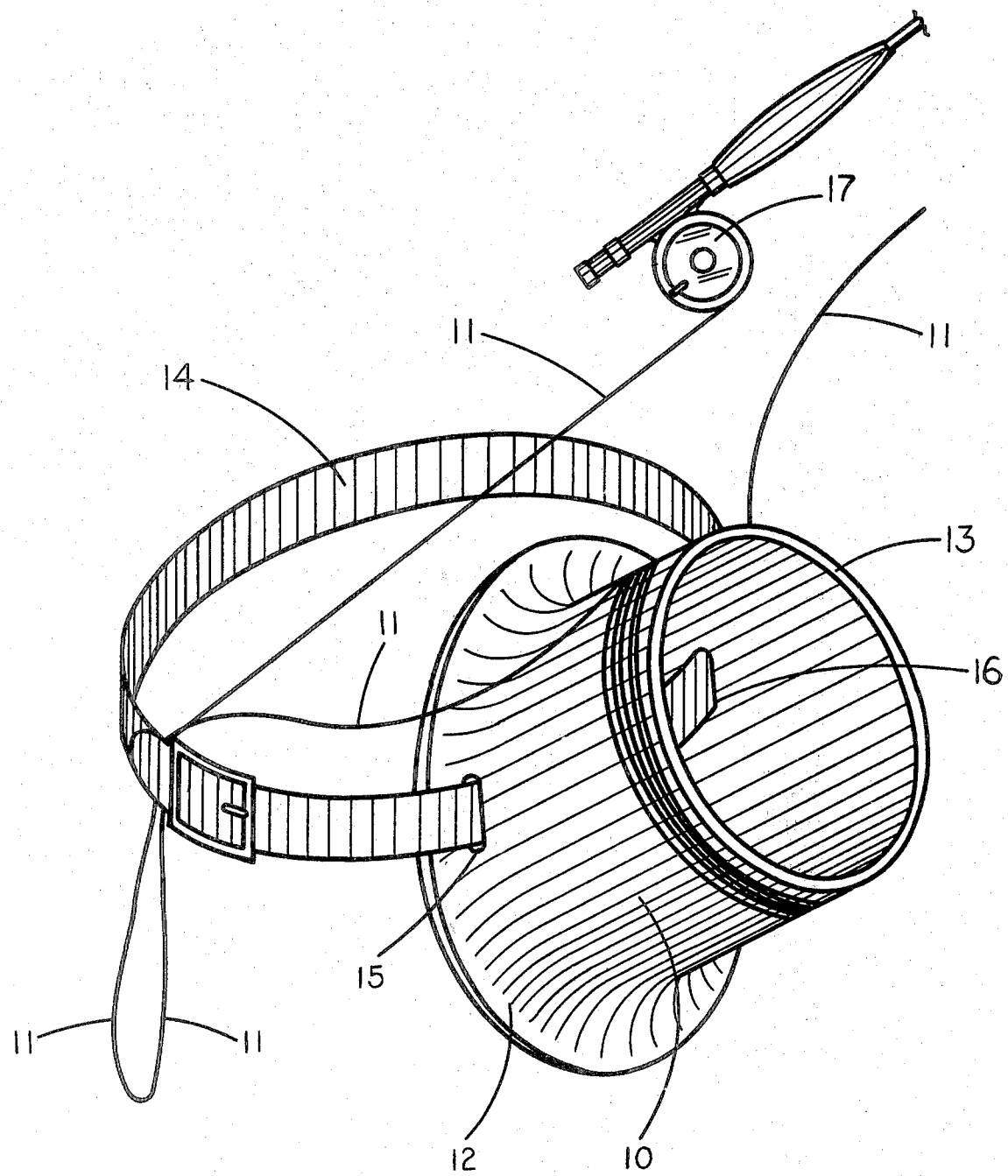

FLY-FISHING ARBOR

This invention relates to fly-casting appreciable distances with a conventional shooting-head tied to a conventional trailing monofilament, hereinafter referred to as a line. The arbor is to be used in combination with, not in place of, a conventional fly-reel. The arbor axis is hereby defined as the longitudinal axis of the cylindrical section of said arbor.

In a U.S. Pat. No. 4,297,802, issued Nov. 3, 1981, is shown a Line Routing and Storing Device having many advantages over the conventional practice of suspending coils of line from either the mouth or left-hand while fly-fishing. The present invention is an improvement on said Line Routing and Storing Device because: (1) it can be used with a conventional line-restraining means, thus eliminating the need for both the line-routing means and the line-tensioning means; and, (2) it incorporates an integral flange into the arbor configuration to prevent such things as waders and garments worn by fisherman from interfering with the hand-winding of line onto the straight cylindrical section of said arbor. Such arbor configuration was first disclosed in Disclosure Document No. 095909.

The general object of this invention is to enable long forward casts with a rugged, simple and low-cost device. This and other objects, advantages and features of the invention will be better understood from the following detailed description, for a right-hand fly-caster, reference being taken to the accompanying drawing in which:

FIG. 1 is a perspective view of the invention with conventional belt, fly-rod, reel and line.

FIG. 1 illustrates arbor 10 of suitable outside-diameter and length for hand-winding and storing line 11. As shown, said arbor with integral flange 12 of suitable size is suitably cut and hot-formed from conventional plastic tubing, such as ABS pipe, to securely locate on waist-line of fly-fisherman with axis of arbor 10 pointing suitably forward and upward in general direction of fly-rod stripping-guide during trajectory of forward cast; which direction serves to minimize any departure-friction due to line 11 axially leaving arbor 10. To properly guide hand-winding, upper-and-outer end 13 of arbor 10 is in a plane roughly perpendicular to said axis of arbor 10, as shown.

FIG. 1 illustrates arbor 10 secured to said waist-line by conventional belt 14 passing through two aligned slots 15 and 16 in wall of said arbor. As shown, line 11 proceeds from conventional fly-reel 17 to proximity of buckle of said belt at right-hip of fisherman, where loop of line 11 is wedged between belt-end and belt 14, and thence to arbor 10, upon which line 11 is wound by hand.

After having pre-positioned shooting-head conventionally beyond rod-tip and having attached line proceed directly through rod-guides to reel 17, the following is done to prepare the invention for a forward cast: (1) strip a measured length of line 11 from reel 17; (2) grasp line 11 near reel 17 with right-hand, pull toward belt-buckle and wedge a loop of said line as shown; (3) route line 11 thence to arbor 10 and hand-wind remainder of said stripped line onto said arbor, having butt-end of shooting-head a few feet beyond rod-tip; and, (4) grasp line 11 near stripping-guide in left-hand, with right-hand holding rod-handle ready for casting.

More than sufficient line 11 for a forward cast is wound onto arbor 10. When a fish strikes and runs, not only is all line 11 permitted to leave arbor 10, but the resulting tensile force in outgoing line 11 pulls said line-loop free of said belt-end, thus releasing line 11 directly to reel 17 for playing said fish. Only at the start of fishing and after the playing of a fish need line 11 be routed from reel 17 to, and a loop of line 11 be wedged between, belt-end and belt 14 before being hand-wound onto arbor 10. Otherwise line 11 is only alternately wound onto and cast from arbor 10.

An alternate conventional means of restraining a loop of line 11 at the right-hip of a fly-fisherman is to pass said loop between conventional belt 14 and the waders or garments worn by said fly-fisherman, having a suitable length of loop project downward from said belt. The object of locating such a conventional restraining means for said line at said right-hip is to prevent any contact between that section of line 11 between reel 17 and arbor 10 with line 11 uncoiling from and leaving arbor 10 during trajectory of the forward cast.

Having thus described the invention, it is understood that certain modifications in construction and arrangement of parts thereof will be made, as deemed necessary, without departing from the scope of the appended claims.

I claim:

1. A non-rotatable arbor for use in a line routing and storing device comprising a cylindrical section and means for attaching the non-rotatable arbor about the waist-line of a fisherman; said non-rotatable arbor to be positioned and oriented so that its axis points in a forward and upward direction from said waist-line; the improvement wherein the non-rotatable arbor includes an integral flange extending radially outwardly from the end of the cylindrical section facing said fisherman to prevent interference of waders and garments worn by a fisherman with the hand-winding of line onto said cylindrical section.

* * * * *